Oct. 8, 1940.  C. L. EKSERGIAN  2,217,646

WHEEL MOUNTING

Filed Jan. 26, 1938   2 Sheets-Sheet 1

INVENTOR.
CAROLUS L. EKSERGIAN.
BY John P. Tarbox
ATTORNEY.

Oct. 8, 1940. C. L. EKSERGIAN 2,217,646
WHEEL MOUNTING
Filed Jan. 26, 1938 2 Sheets-Sheet 2
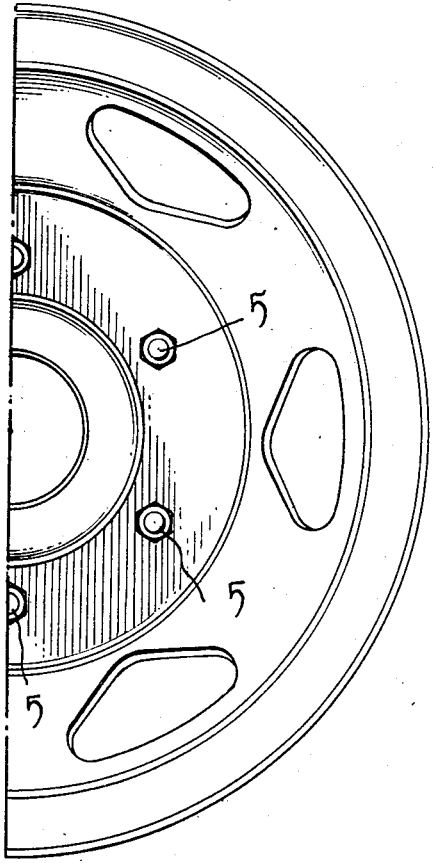
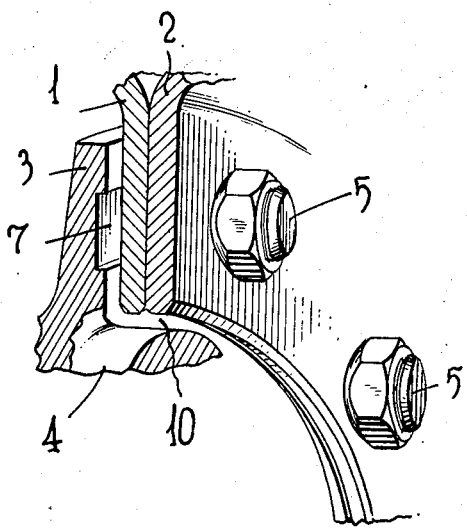
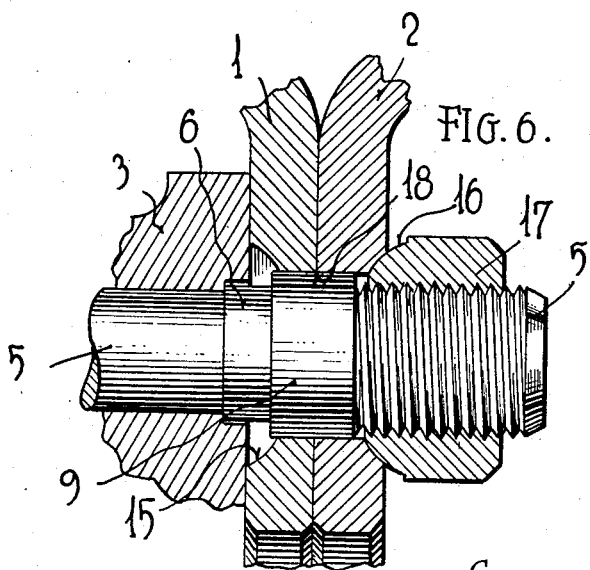
Inventor
CAROLUS L. EKSERGIAN.

Patented Oct. 8, 1940

2,217,646

UNITED STATES PATENT OFFICE 2,217,646

WHEEL MOUNTING

Carolus L. Eksergian, Detroit, Mich., assignor to Budd Wheel Company, Philadelphia, Pa., a corporation of Pennsylvania Application January 26, 1938, Serial No. 186,932

1 Claim. (Cl. 301—9)

This invention relates to vehicle wheels and more particularly to demountable dual wheel constructions for motor vehicles.

The invention consists in providing a dual wheel construction with detachable annular wheel bodies adapted to carry on their outer peripheries the tires, and adapted to be detachably connected near their inner peripheries to the hub of the wheel.

The wheel bodies are preferably made of resilient metal, such as steel, and are dished axially so as not only to secure a suitable resiliency of the metal bodies against axial strains, but also to enable the wheel bodies carrying the tires, to be mounted in pairs, side by side, on the same hub of a wheel, if desired. The wheel discs are detachably connected to the hub by suitable fastening devices, such as bolts or studs and nuts, so that the wheel discs either with or without the tires thereon, may be readily applied to or removed from the hub of the wheel.

More particularly, the present invention is concerned with a dual wheel construction of this kind and has for its object to provide means by which the inner wheel body may be quickly and accurately positioned and centered during assembly and held in such a position, while the outer wheel body is being assembled and centered subsequently.

Another object is to mount the dual wheel bodies on a plurality of studs each having an enlarged outer mounting portion on which the inner wheel body is centered entirely by said enlarged portions of the studs and the outer wheel body is centered by the ball face of the single securing nut associated with each stud.

Another object is to provide, on a common bolt circle, a group of large bodied studs and a group of smaller bodied studs, a stud from one group being placed alternately with a stud of the other group.

The invention will be more fully understood after reference to the accompanying drawings, in which like parts are indicated by similar reference symbols throughout the several views, and in which—

Figure 1 shows a side elevation of a wheel construction embodying one form of the invention;

Figures 2 and 3 are cross-sections on the lines 2—2 and 3—3 respectively, of Figure 1;

Figure 4 shows a partial side elevation of a wheel construction embodying the preferred form of the invention;

Figure 5 is a partial perspective view of the wheel construction shown in Figure 4, showing the relation of the wheel bodies to the hub structure; and Figure 6 is a further modification of the construction shown in Figure 4.

Throughout the description it is intended that the inner wheel body denote that body which is axially innermost of the dual wheel assembly. It is that wheel body which lies adjacent to the hub flange, and might also be termed the inboard wheel body. The term outer wheel body denotes that body which is axially outermost of the dual wheel assembly.

As illustrated, 1 and 2 are respectively the inner and outer wheel bodies forming the dual wheel assembly. They are disc wheels, each preferably formed in the same manner as the other to be interchangeable. They are each dished axially throughout a portion of their bodies and are planar in their portions 1a and 2a, the better to enable them to be mounted in pairs, side by side, on the same hub.

Figure 3:
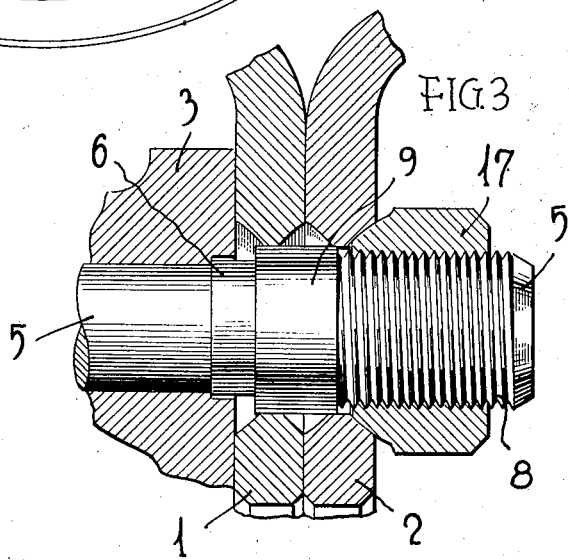

Referring more particularly to Figures 4 and 5, the wheel discs 1 and 2, shown only partially, are mounted adjacent to the flange 3 of the wheel hub 4. The flange is annular and is preferably formed integrally with the hub. In Figure 4, large bodied studs 5, are mounted on a common bolt or stud circle, and are secured to the hub flange in a way common to the art. They are kept from turning in the hub flange by means of the portion 6 which fits in the groove portion 7 of the hub flange. These mechanical expedients form no part of this invention. However, as shown in Figure 3, the stud 5 is threaded at 8 and intermediate this threaded portion and the portion 6 is an enlarged portion 9, forming a very important feature of this invention. This enlarged portion is smooth and cylindrical in form, the diameter of the cylinder being slightly greater than the diameter of the threaded portion of the stud. Axially of the stud it is of such a length as to comprehend at least one half of the thickness of each of the wheel discs. It is positioned axially of the stud so that for a given wheel disc thickness, it will fall immediately below the mid-portions of the wheel discs. It will be observed that the space about the portion 9 and between it and the hub flange 3 is unobstructed as result of which the innermost wheel disc may directly engage the hub flange for firm seating.

Each wheel disc is provided with a central opening through which the hub 4 extends in spaced relation to said wheel discs. It is to be particularly noted that the hub 4 does not serve as a wheel-center seat, but that there is deliberately provided a sufficient clearance 10, so that at all times, the wheel discs are spaced from the hub. The preservation of this space is important in that, from a manufacturing standpoint, it is impossible to hold dimensions so closely that the wheel bodies would not ride either on the hub or on the studs and nuts. In the construction shown herein, the wheel discs are entirely free of the hub barrel and ride solely upon the studs and nuts. This of necessity demands a stronger stud construction and such is shown herein. Particularly in trucks and heavy duty vehicles, it is essential that heavy studs be employed, because the wheel loadings and shocks are more severe. The studs shown in Figs. 4 and 5 are all alike. The inner wheel disc is mounted by placing it over the studs through the provision of a plurality of concave sockets 15, centrally perforated and positioned at equal distances from the center of the disc. The edges of the perforations rest on the enlarged portion 9 of the stud and thereby the inner wheel disc is centered entirely by this means and its inner face rests firmly against the face of the hub flange. The outer wheel disc is provided with perforations identical to those of the inner wheel disc and the same is mounted by placing it over the studs so that the wheel discs abut in the region of the stud or bolt circle. The outer wheel disc is then centered by the ball face 16 of the nut 17 as the latter is tightened, the ball face 16 contacting the concave socket 15. As may be observed from Figs. 3 and 6, the large screw-threaded portion 8 of the studs 5, which is slightly smaller than the cylindrical portion 9, also aids in preliminarily centering the outer wheel body when the latter is placed upon the studs so that when the nuts 17 are tightened up, they automatically enter in the concave recesses 15 of the wheel body to complete the centering operation of that body. The possibility of the conical portion of the nuts 17 entering the concavities 15 is due to the fact that the diameter of the threaded portion of the stud is only slightly less than the diameter of the cylindrical portion of the stud, whereas if there was much difference between the diameters of the cylindrical and threaded portions, the innermost end of the nut might engage the flat outer face of the wheel body and not be permitted to enter the concavities 15. Thus the relative sizes of these parts render possible the ready mounting of the outer wheel body as soon as the latter is initially placed in position over the threaded portion of the studs to the extent that the nuts may be applied to the latter.

Usually, and preferably, the discs 1 and 2 are identical, so that they are interchangeable as respects their outboard and inboard positions. Such a construction is shown in Figures 3, 4, and 5. But, in Figure 6, it is to be noted that the discs are provided with concave sockets on one face only. Where the discs abut, as at 18, no concave sockets exist. This is a modification, of course, and it is apparent that in this instance, the discs would not be interchangeable in the sense that discs from the rear wheels could be used on the front wheels. Further, it is to be noted that in this modification, the discs have somewhat of a broader bearing surface on the enlarged portion 9.

In the preferred form of the invention, where all of the studs are of the same size, the construction affords the strongest wheel assembly.

Figure 1:
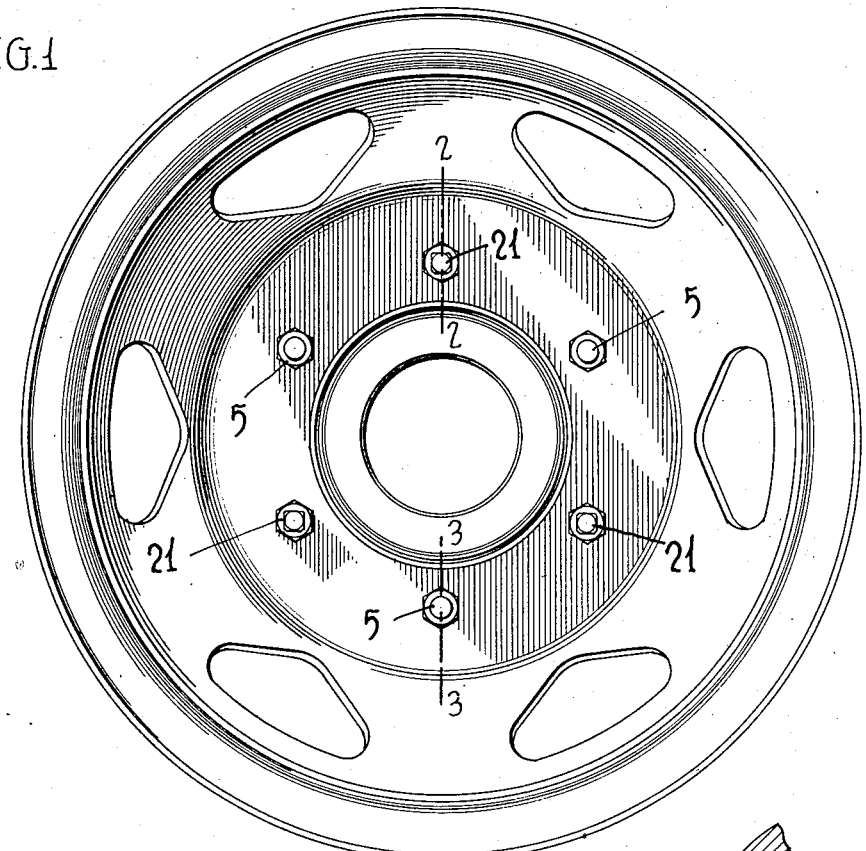
Figure 2:
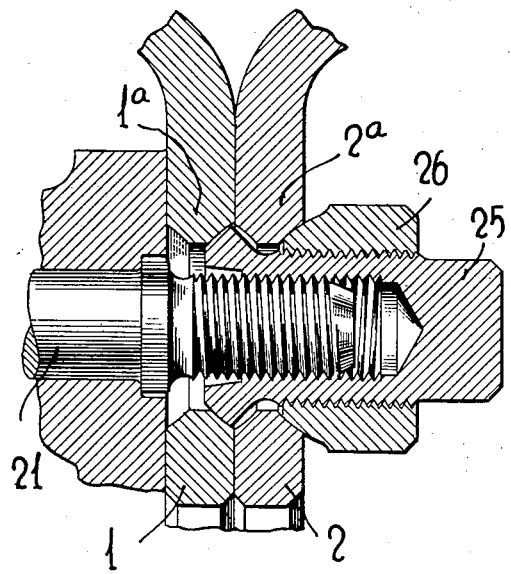

Coming now to Figure 1, it is to be noted that, on a common bolt or stud circle, a number of large bodied studs are placed alternately with a a number of smaller bodied studs, as for instance, smaller stud 21 is placed between the larger studs 5 and 5, and so on around the circle. Stud 5 is of the size shown in Figure 3 and employs a nut 17. Stud 21 is of the size shown in Figure 2, and employs the well known dual nut arrangement; that is, the cap nut 25 and the nut 26. This latter assembly forms no part of this invention, said stud and dual nut combination having been patented. However, by alternating the two types of studs, it can be seen that the enlargements on the group of larger studs serve to center the inner wheel disc and this permits a much easier centering when the cap nut 25 is applied to the stud shown in Figure 2.

The construction shown assures perfect alignment of both wheel discs and the larger studs add an assurance of strength.

It is to be understood, however, that the description and drawings are for the purpose of illustration and example only, and are not to be taken as limiting the scope of this invention. Such limitation is to be only by the prior art, and by the terms of the appended claim.

I claim:

A vehicle wheel comprising a hub having an annular flange, a plurality of screw-threaded bolts carried by said flange, said bolts being divided into two groups, the bolts of one group alternating each with the bolts of the second group, all of the bolts being on a common bolt circle, the bolts of the first group having intermediate their ends a cylindrical enlargement, a pair of annular dished wheel discs, each provided with a central opening through which the hub extends in spaced relation to said wheel discs and a plurality of concave sockets centrally perforated and positioned at equal distances from the center of said disc, said discs being reversely mounted with respect to said hub with said bolts extending through said perforations, the innermost wheel disc being supported and centered by the first group of bolts having the enlargements, means on the bolts of the second group for detachably connecting and centering said inner wheel to said hub comprising cap nuts threaded on said bolts, and means for detachably connecting said outer wheel disc to said hub comprising nuts threaded on the bolts of the first group and on said cap nuts and being provided with convex bosses engaging only in the concave sockets of the outer wheel disc to center the same.

CAROLUS L. EKSERGIAN.